(12) United States Patent
de Vries et al.

(10) Patent No.: US 12,225,887 B2
(45) Date of Patent: Feb. 18, 2025

(54) APPARATUSES, SYSTEMS, AND METHODS FOR CONTROLLING ONE OR MORE ASSEMBLIES OF AN ENERGY GENERATION SYSTEM

(71) Applicant: Silicon Ranch Corporation, Nashville, TN (US)

(72) Inventors: Nicholas G. J. de Vries, Alameda, CA (US); Michael Baute, Whites Creek, TN (US)

( * ) Notice: Subject to any disclaimer, the term of this patent is extended or adjusted under 35 U.S.C. 154(b) by 0 days.

(21) Appl. No.: 17/885,083

(22) Filed: Aug. 10, 2022

(65) Prior Publication Data

US 2022/0393639 A1 Dec. 8, 2022

Related U.S. Application Data

(62) Division of application No. 17/357,526, filed on Jun. 24, 2021.

(60) Provisional application No. 63/043,132, filed on Jun. 24, 2020.

(51) Int. Cl.
*A01K 3/00* (2006.01)
*H02S 20/32* (2014.01)
*H02S 50/00* (2014.01)

(52) U.S. Cl.
CPC ............... *A01K 3/00* (2013.01); *H02S 20/32* (2014.12); *H02S 50/00* (2013.01)

(58) Field of Classification Search
CPC ....................................................... H02S 20/32
See application file for complete search history.

(56) References Cited

U.S. PATENT DOCUMENTS

| 2014/0366929 | A1* | 12/2014 | Blau | F24S 20/55 |
| | | | | 136/246 |
| 2022/0077813 | A1* | 3/2022 | Raghuchandra | H02S 20/32 |

* cited by examiner

*Primary Examiner* — Jayne L Mershon
(74) *Attorney, Agent, or Firm* — Husch Blackwell LLP; Timothy L. Capria; Alexandra C. Lynn (57) ABSTRACT

Apparatuses, systems, and methods are provided for controlling one or more assemblies of an energy generation system. The method may include selecting at least a portion of the one or more assemblies, transmitting at least one control signal associated with the selected at least a portion of the one or more assemblies, receiving the control signal at a communication module of the one or more assemblies, and modifying an operational parameter of the one or more assemblies responsive to the received control signal to avoid contact between the one or more assemblies and livestock. The operational parameter may be associated with a position of the at least a portion of the one or more assemblies relative to a ground surface. The operational parameter may additionally or alternatively be a range of angle of the at least a portion of the one or more assemblies.

11 Claims, 5 Drawing Sheets

APPARATUSES, SYSTEMS, AND METHODS FOR CONTROLLING ONE OR MORE ASSEMBLIES OF AN ENERGY GENERATION SYSTEM

CROSS-REFERENCES TO RELATED APPLICATIONS

This application claims benefit of U.S. Provisional Patent App. No. 63/043,132 filed Jun. 24, 2020, and entitled "APPARATUSES, SYSTEMS, AND METHODS FOR CONTROLLING ONE OR MORE ASSEMBLIES OF AN ENERGY GENERATION SYSTEM," which is fully incorporated herein by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND

The present disclosure relates generally to apparatuses, systems, and methods for controlling one or more assemblies of an energy generation system.

Solar panels and other energy generation devices may be moveable, which might encounter one or more obstacles while using, thus endangering agriculture and livestock, such as cattle which might be impacts and/or injured by panels. What is needed are apparatuses, systems, and methods to control one or more operations of an energy generation system to prevent such damage.

BRIEF SUMMARY

Embodiments of the present disclosure provide apparatuses, systems, and methods for controlling one or more assemblies of an energy generation system. The system may include a photovoltaic design and system management platform capable of co-locating solar energy generation and agriculture production, for use, for example, with livestock such as cattle.

Aspects of the present disclosure relate to a method of controlling one or more assemblies of an energy generation system. The method may include selecting at least a portion of the one or more assemblies, transmitting at least one control signal associated with the selected at least a portion of the one or more assemblies, receiving the control signal at a communication module of the one or more assemblies, and modifying an operational parameter of the one or more assemblies responsive to the received control signal to avoid contact between the one or more assemblies and livestock. The operational parameter may be associated with a position of the at least a portion of the one or more assemblies relative to a ground surface. The operational parameter may additionally or alternatively be a range of angle of the at least a portion of the one or more assemblies. The operational parameter may additionally or alternatively be 20 degrees from parallel to the ground surface when operating in a grazing mode (e.g., +/−20 degrees). The operational parameter may be between 50-60 degrees from parallel to the ground surface when operating in a standard tracking mode (e.g., +/−50-60 degrees).

The operational parameter may provide a vertical clearance distance between a lowest portion of a section of the one or more assemblies and a ground surface. The one or more assemblies may be associated with a livestock paddock of a plurality of paddocks. The at least one control signal may be transmitted from a user device. The selecting the at least a portion of the one or more assemblies may be performed using the user device. The method may include transitioning livestock between a plurality of paddocks by designating a current use area, wherein the transitioning includes placing at least a portion of the one or more assemblies into a grazing mode and placing at least a portion of the one or more assemblies into a standard tracking mode from a grazing mode based upon status of the one or more assemblies as being within a current use area.

Additional aspects of the present disclosure relate to a method of controlling one or more assemblies of an energy generation system including dividing a useable space into a plurality of regions, capturing solar energy using a plurality of assemblies located at one or more of the plurality of regions, designating a current use region of the plurality of regions, the current use region corresponding to a region associated with current or expected use by livestock, controlling an operational setting of at least one assembly of the plurality of assemblies, the at least one assembly associated with the current use region, and selectively adjusting an operational setting of at least one assembly of the plurality of assemblies associated status change in relation to a current use region.

The method may include wherein the designating the current use region comprises associating a livestock paddock with a current grazing status, and further comprising obtaining a selection of one or more of the plurality of assemblies associated with the livestock paddock and providing a control signal to the one or more of the plurality of assemblies to place the one or more of the plurality of assemblies associated with the livestock paddock into a grazing mode of operation. The placing the one or more of the plurality of assemblies associated with the livestock paddock into a grazing mode of operation may include limiting movement of at least a portion of the one or more of the plurality of assemblies to avoid contact between livestock within the livestock paddock and the one or more of the plurality of assemblies. The method may further include determining that a next livestock paddock is available for use, moving livestock within the current use region to the next livestock paddock, and designating the next livestock paddock as the current use region. The method may further include selecting at least a portion of the one or more of the plurality of assemblies associated with the livestock paddock, transmitting at least one control signal to the at least a portion of the one or more of the plurality of assemblies associated with the livestock paddock, and placing the at least a portion of the one or more of the plurality of assemblies associated with the livestock paddock into a standard tracking mode responsive to the at least one control signal.

Still further aspects of the present disclosure relate to an assembly apparatus including at least one solar cell configured to capture solar energy, an energy storage configured to store at least a portion of solar energy captured by the at least one solar cell, a panel actuator configured to manipulate an operational parameter of the at least one solar cell, a communication module configured to receive at least one control signal, and a processor configured to control the panel actuator to manipulate the operational parameter of the at least one solar cell based at least in part upon the at least one control signal. The operational parameter may be a current or expected presence status adjacent to the at least one solar cell. The presence status may be a livestock presence indication, and the panel actuator may manipulate an orientation of the at least one solar cell responsive to a control signal received from the processor responsive to the operational parameter. The panel actuator may limit movement of the at least one solar cell within 20 degrees from parallel to a ground surface (e.g., +/−20 degrees) when the assembly apparatus operates in a grazing mode. The panel actuator may limit movement of the at least one solar cell within 55 degrees from parallel to a ground surface (e.g., +/−55 degrees and/or +/− between 50-60 degrees) when the assembly apparatus operates in a standard tracking mode.

Numerous other objects, features, and advantages of the present invention will be readily apparent to those skilled in the art upon a reading of the following disclosure when taken in conjunction with the accompanying drawings.

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Referring generally to FIGS. 1-6 in conjunction with the description and illustrations herein, various exemplary apparatuses, systems, and methods are provided according to aspects of the present disclosure.

Figure 1:
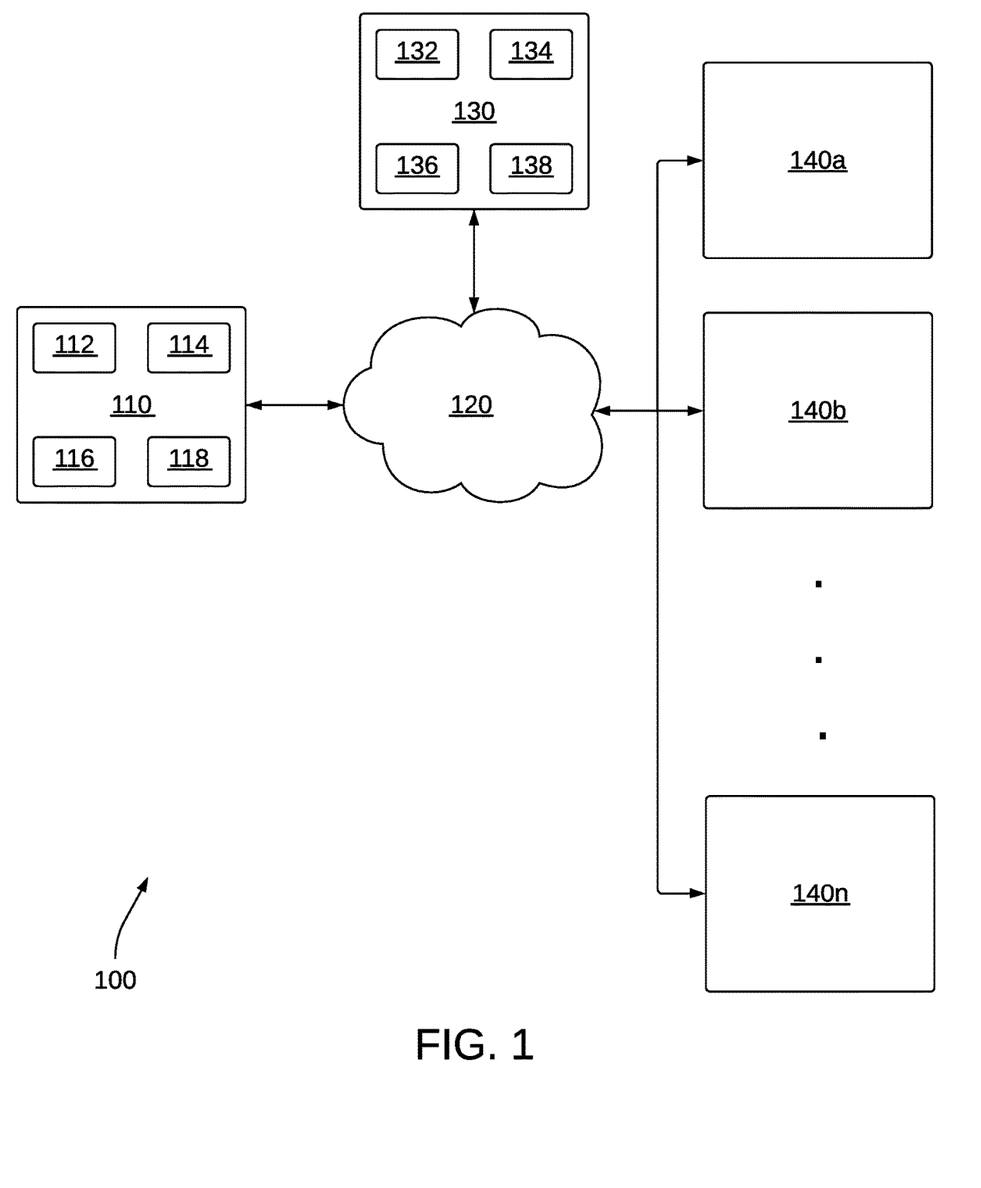
FIG. 1 illustrates an exemplary embodiment of a partial block network diagram according to aspects of the present disclosure.

FIG. 1 illustrates an exemplary embodiment of a partial block network diagram according to aspects of the present disclosure. The system 100 is a simplified partial network block diagram reflecting a functional communicative configuration implementable according to aspects of the present disclosure. The system 100 includes a user device 110 coupleable to a network 120, a server 130 coupleable to the network 120, and one or more assemblies 140a, 140b, . . . , 140n coupleable to the network 120. One or more assemblies 140a, 140b, . . . , 140n may or include be or include a photovoltaic panel or tracker in various embodiments. The server 130 may be a standalone device or in combination with at least one other external component either local or remotely communicatively coupleable with the server 130 (e.g., via the network 120).

In one exemplary embodiment, the network 120 includes the Internet, a public network, a private network, or any other communications medium capable of conveying electronic communications. Connection between elements or components of FIG. 1 may be configured to be performed by wired interface, wireless interface, or combination thereof, without departing from the spirit and the scope of the present disclosure. At least one of the user device 110 and/or the server 130 may include a communication unit 118, 138 configured to permit communications for example via the network 120.

In one exemplary operation, at least one of user device 110 and/or server 130 is configured to store one or more sets of instructions in a volatile and/or non-volatile storage element 114, 134. The one or more sets of instructions may be configured to be executed by a microprocessor 112, 132 to perform operations corresponding to the one or more sets of instructions.

In various exemplary embodiments, at least one of the user device 110 and/or server 130 is implemented as at least one of a desktop computer, a server computer, a laptop computer, a smart phone, or any other electronic device capable of executing instructions. The microprocessor 112, 132 may be a generic hardware processor, a special-purpose hardware processor, or a combination thereof. In embodiments having a generic hardware processor (e.g., as a central processing unit (CPU) available from manufacturers such as Intel and AMD), the generic hardware processor is configured to be converted to a special-purpose processor by means of being programmed to execute and/or by executing a particular algorithm in the manner discussed herein for providing a specific operation or result.

One or more computing component and/or functional element may be configured to operate remotely and may be further configured to obtain or otherwise operate upon one or more instructions stored physically remote from the user device 110, server 130, and/or functional element (e.g., via client-server communications and/or cloud-based computing).

At least one of the user device 110 and/or server 130 may include a display unit 116, 136. The display unit 116, 136 may be embodied within the computing component or functional element in one embodiment and may be configured to be either wired to or wirelessly interfaced with at least one other computing component or functional element. The display unit may be configured to operate, at least in part, based upon one or more operations of the described herein, as executed by the microprocessor 112, 132.

Various environmental and operational conditions might impact power generated by one or more assemblies 140. For example, solar energy incident on various assemblies 140, ambient temperature, and/or other factors may impact power generated by each assembly. Depending upon the number and type of assemblies 140 used, the generated power may vary widely in terms of generated voltage and/or current. Changes in temperature, solar irradiance, and shading, either from near objects such as trees or far objects such as clouds, may cause power losses. Other factors, such as device age, particle collection on a surface of the assembly 140, and/or device degradation, might negatively affect performance of an assembly 140.

As described herein, an assembly 140 or group of assemblies 140 may optionally include or take the form of one or more photovoltaic modules or arrays, such as described for example in U.S. Pat. No. 10,116,256, which is hereby incorporated by reference in its entirety.

Figure 2:
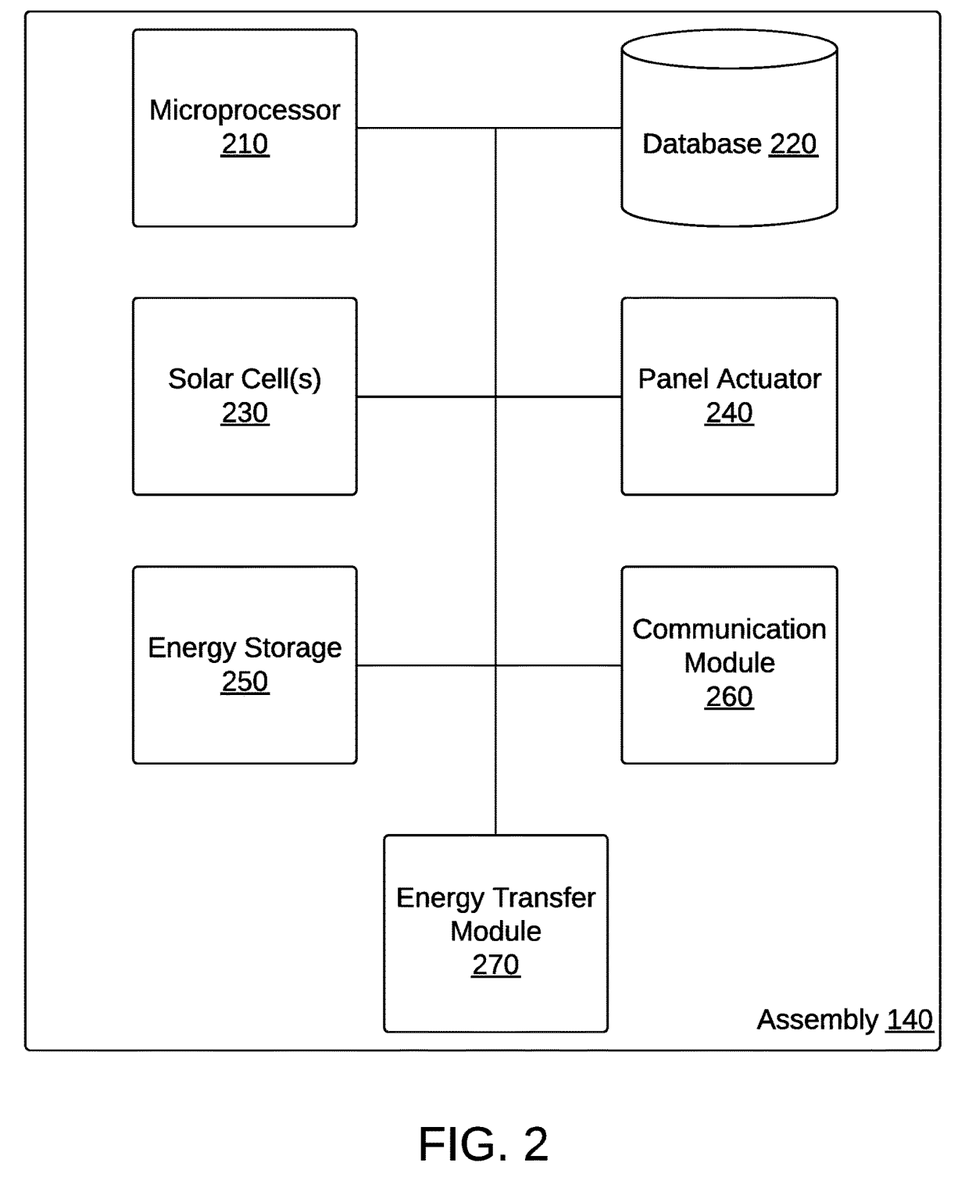
FIG. 2 illustrates an exemplary embodiment of a block diagram of an assembly according to aspects of the present disclosure.

FIG. 2 illustrates an exemplary embodiment of a block diagram of an assembly 140 according to aspects of the present disclosure. An assembly 140 may include one or more of a microprocessor 210, a database 220, one or more solar cells 230, a panel actuator 240, an energy storage 250, a communication module 260 and/or an energy transfer module 270. One or more of the microprocessor 210, the database 220, the one or more solar cells 230, the panel actuator 240, the energy storage 250, the communication module 260 and/or the energy transfer module 270 may be communicatively and/or conductively coupleable to at least one other elements via a communicative and/or conductive bus. Like microprocessor 112, 132, the microprocessor 210 may be a generic hardware processor, a special-purpose hardware processor, or a combination thereof. In embodiments having a generic hardware processor (e.g., as a central processing unit (CPU) available from manufacturers such as Intel and AMD), the generic hardware processor is configured to be converted to a special-purpose processor by means of being programmed to execute and/or by executing a particular algorithm in the manner discussed herein for providing a specific operation or result.

The database 220 may be at least one volatile and/or non-volatile storage mediums configured to store at least one set of information used to perform or enable one or more operations described herein. Although illustrated as being physically embodied within the assembly 140 it should be appreciated that at last a portion of the database 220 may be or include at least one storage physically and/or logically remote from the assembly 140 (for example, in the case of distributed or cloud-based storage, either in whole or in part). One or more solar cells 230 may be used to capture solar energy and to convert the captured energy into a storable form, which may be stored for example at the energy storage 250. One or more solar cell 230 may be a photovoltaic cell or other solar energy capture element. Although described with reference to a solar cell it should be appreciated that at least one cell 230 may be any form of energy capturing or generation device. For example, at least one cell 230 may include a wind turbine, hydroelectric turbine, or any other form of energy capture or generation element capable of being physically moved or adjusted to avoid one or more entities which might come into physical contact with the cell 230. A panel actuator 240 may be configured to adjust and/or set an operating position of at least one solar cell 230, for example to capture a maximum amount of solar energy and/or to avoid one or more obstacles within a physical movement range of the at least one solar cell 230. At least one solar cell 230 may be or include a non-flat solar tile in various embodiments.

The energy storage 250 may be an energy storage element capable of storing at least a portion of energy captured or generated by at least one cell 230. The energy storage 250 may be a battery or capacitive storage element in various embodiments which is configured to receive charging power from at least one cell 230.

The communication module 260 may be configured to be communicatively coupleable to one or more elements via a wired connection, a wireless connection, or combination thereof. In various embodiments, the communication module 260 may be configured to communicate with another communication module 260 of another assembly 140 within a wired and/or wireless communication range (for example, form a daisy-chain style configuration and/or to form a redundant communication configuration). At least one communication module 260 may be configured to communicate via the network 120, for example to one or more of the user device 110 and/or server 130. The assembly 140 may be configured to transmit and/or receive one or more of operation parameters, settings, configuration, usage information, current and/or historical data, hardware information or hardware update information, or any other information to and/or from one or more of the user device 110 and/or server 130 during operation to enable and/or perform one or more functions described herein.

An energy transfer module 270 may be configured to transmit and/or to receive power to/from the assembly 140. For example, the energy transfer module 270 may be configured to output power generated by the assembly 140, for example as currently being generated by the assembly 140 and/or as stored at the energy storage 250. In various embodiments, a group of assemblies 140 may share one or more energy storages 250 local to and/or remote from each assembly 140 and may transmit generated power to the one or more energy storage 250 for storage during operation.

Figure 3:
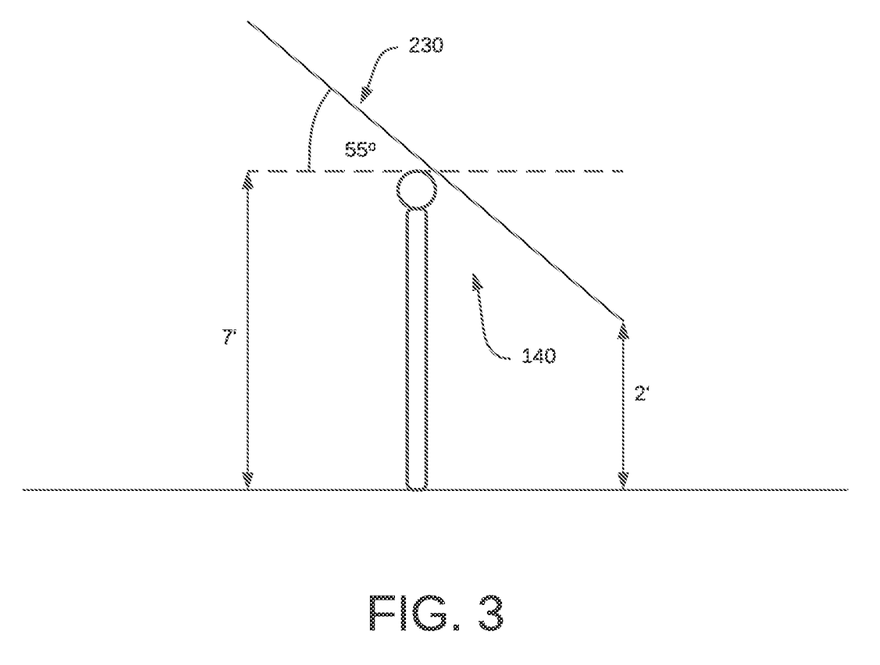
FIG. 3 illustrates an exemplary embodiment of a partial side view of an assembly operating in a tracking configuration according to aspects of the present disclosure.
Figure 4:
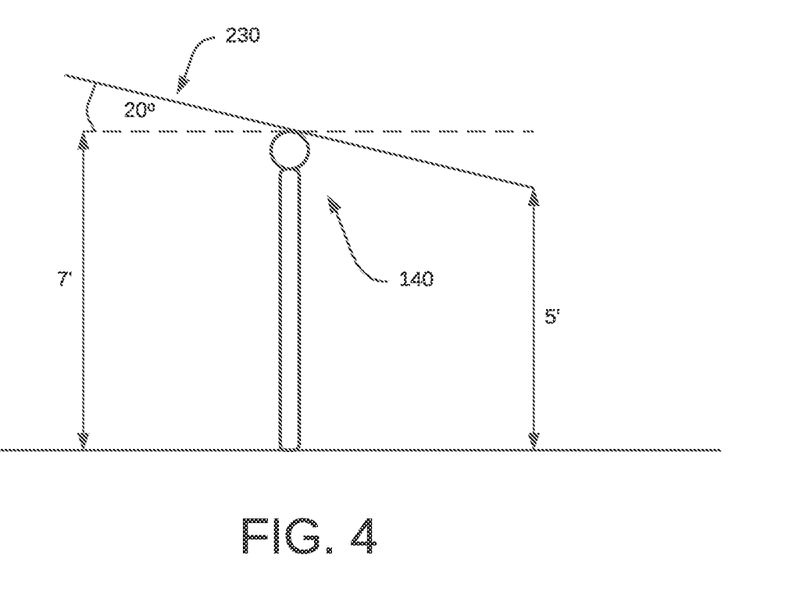
FIG. 4 illustrates an exemplary embodiment of a partial side view of an assembly operating in a grazing configuration according to aspects of the present disclosure.

FIG. 3 illustrates an exemplary embodiment of a partial side view of an assembly operating in a tracking configuration according to aspects of the present disclosure. FIG. 4 similarly illustrates an exemplary embodiment of a partial side view of an assembly operating in a grazing configuration according to aspects of the present disclosure. As illustrated by the configurations provided by FIGS. 3 and 4, an assembly 140 may be adjusted, for example, between a range of +/−20 degrees (FIG. 4) and +/−50-60 (e.g., 55) degrees (FIG. 3) relative to a ground surface. Based on these angular distances, a significant range of distance from a solar cell 230 of the assembly 140 from a ground surface may be varied during operation. For example, in the configuration illustrated by FIG. 3, a 55-degree angle of a solar cell 230 of the assembly 140 relative to the ground surface would result in an end of the solar cell 230 being just two feet from the ground surface, whereas a 20-degree angle of the solar cell 230 relative to the ground surface as illustrated by FIG. 4 would result in an end of the solar cell 230 being five feet from the ground surface. In various embodiments, at least one solar cell 230 of an assembly 140 may be configured to actively track the motion of the sun to generate maximum energy, for example, in the range between 20 to 55 degrees relative to ground surface as illustrated by FIGS. 3 and 4.

In various exemplary embodiments, a standard tracking mode may include a +/−55-degree tracking angle limit. A clearance limit to ground surface may be implemented, such as a two-foot height requirement from the solar cell 230 to ground surface, although different values maybe implemented without departing from the spirit and scope of the present disclosure. In a rotating ten-paddock example, a particular assembly 140 may be configured to operate in the standard tracking mode for 90% of the time assuming an equal distribution of time across each paddock area. In contrast, in a grazing mode there may be a +/−20-degree tracking angle limit. A clearance limit to ground surface may be implemented, such as a five-foot height requirement from the solar cell 230 to ground surface, although different values maybe implemented without departing from the spirit and scope of the present disclosure. In a rotating ten-paddock example, a particular assembly 140 may be configured to operate in the grazing mode for 10% of the time assuming an equal distribution of time across each paddock area. The grazing mode reduced angle tracking may result in lower power generation, such as, for example, an 1897 MWh/MWp/a value for the standard tracking mode as compared to a value of 1777 MWh/MWp/a for the grazing mode.

A height of five feet while operating at 20 degrees from surface such as illustrated by FIG. 4 might be sufficient in many embodiments to permit livestock such as cattle to freely graze and roam beneath the solar cells 230 without being impacted by the solar cells 230 and thereby causing damage to the solar cells 230 and/or livestock, although other heights and angles may be used without departing from the spirit and scope of the present disclosure.

Figure 5:
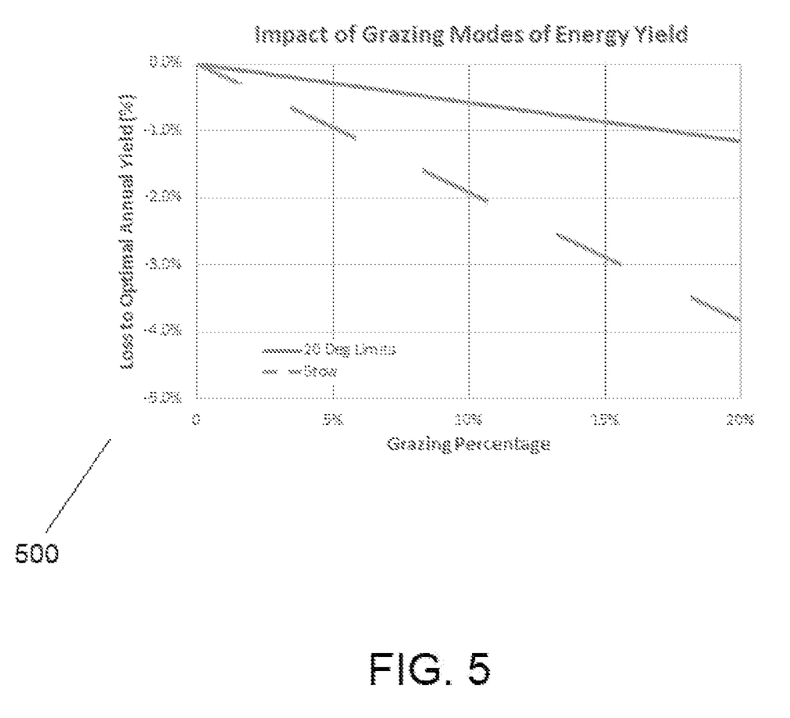
FIG. 5 illustrates an exemplary embodiment of a graph of an impact of grazing modes of energy yield according to aspects of the present disclosure.

FIG. 5 illustrates an exemplary embodiment of a graph of an impact of grazing modes of energy yield according to aspects of the present disclosure. Having livestock share space with power generation systems might involve multiple trade-offs. For example, as illustrated by the graph 500, clearance from grade of the ground surface may be a dimension to eliminate animal to equipment interaction. One solution to permit both power generation and animals in a common space or paddock may be provided by increasing a pile height of the solar cells 230 from the ground surface. However, such implementation might significantly increase the cost of both the power generation system hardware but also installation cost. In various embodiments, range of movement of one or more solar cell(s) 230 may be configured to move a maximum of 20 degrees relative to the ground surface to avoid animals, or may be configured to place the assembly 140 in a flat, zero-degree (e.g., stow) configuration to provide maximum clearance for animals when the space of paddock is being shared. Notably, these configurations might negatively affect power generation by one or more assemblies 140 in a shared space, as illustrated by FIG. 5.

In various exemplary embodiments, livestock such as cattle might only graze in a paddock for a limited portion of time (e.g., 10% in a ten-paddock configuration), but this can fluctuate depending on numerous factors, such as grass and weather conditions. A pile height associated with an assembly 140 may be raised, however doing so increases cost to the structure and to the installation. In various embodiments, an angle of the solar cell 230 may be adjusted relative to a stow position of zero degrees relative to a ground surface. Stowing the solar cell 230 may place the assembly 140 in its safest position, for example from wind or animal interaction.

In various embodiments, a solar cell 230 may be placed in a stow configuration parallel to a ground surface. The solar cell 230 may be, for example, seven feet above the ground surface in an exemplary embodiment, although other heights may be implemented according to factors such as terrain, height of an object to avoid, or any other criteria. In a grazing operation such as illustrated by FIG. 4, a minimum distance from the solar cell 230 to the ground surface may be five feet, although other heights may be implemented according to factors such as terrain, height of an object to avoid, or any other criteria.

In various exemplary embodiments, operation in the grazing mode may reduce power production. For example, in a +/−55-degree standard tracking mode as compared to a +/−20-degree grazing mode, overall production may be reduced by 5.7% assuming a ten-paddock configuration. If operated in the grazing mode for 10% of the time, there may be a 0.57% annual loss in production in this scenario, assuming a seven-foot-tall assembly 140 having a 33% Ground Coverage Ratio (GCR) Bifacial system. At standard operation, the standard tracking mode may produce an output of 1897 MWh/MWp whereas the grazing mode may result in an output of 1777 MWh/MWp. Thus, assuming 10% grazing mode operation, a total average production would be 1885 MWh/MWp.

Implementations consistent with the present disclosure may permit livestock movement through an energy generation system using one or more physical and/or virtual livestock fencing configurations integrated into a tracker control function, of various inverter blocks for example. These configurations may include geofencing applications, virtual fencing, fenceless control systems, Global Positioning System (GPS) ear tags, or any other control scheme implementable by an energy generation system described herein. In various embodiments a property may be subdivided by inverter blocks, or sub-blocks, using these various interior fencing systems to accommodate one or more forms of "rotational grazing." Examples of rotational grazing may include Adaptive Multi-Paddock Grazing (AMP Grazing), management intensive rotational grazing, holistic planned grazing, mob grazing, or the like.

Livestock may be rotated through each subdivision as needed, based at least in part upon environmental conditions, forage quality and quantity, livestock production considerations, or the like. One or more tracker modules may be applied to at least one assembly 140 and may be activated, for example, by a rancher when a particular area or paddock is being opened to livestock. Additionally or alternatively, one or more tracker modules may be capable of independently and/or dynamically determining when livestock or other possible obstructions within range and transitioning at least one assembly 140 to a grazing mode. Assuming a ten-subdivision area, only the 10% of area where livestock is currently located may be set within a grazing mode at any time. As such, the remaining 90% of area may be maintained in a standard tracking mode such that the assemblies 140 contained therein are capable of angular adjustment within an entire range of motion, without risk of damage to assembly 140 or livestock.

The cattle grazing mode may be selected by a user (for example, a rancher) for a particular area and corresponding assemblies 140 using an app installed at the user device 110 or interface accessible to the user via the user device 110 such as a webpage via network 120. The user device 110 may be configured to transmit at least one parameter to at least one assembly 140 according to the designated mode, for example via the network 120. Similarly, a user may select one or more areas and corresponding assemblies 140 into a standard tracking mode when livestock are not present, and the designation may similarly be transmitted from the user device 110 via the network 120.

Figure 6:
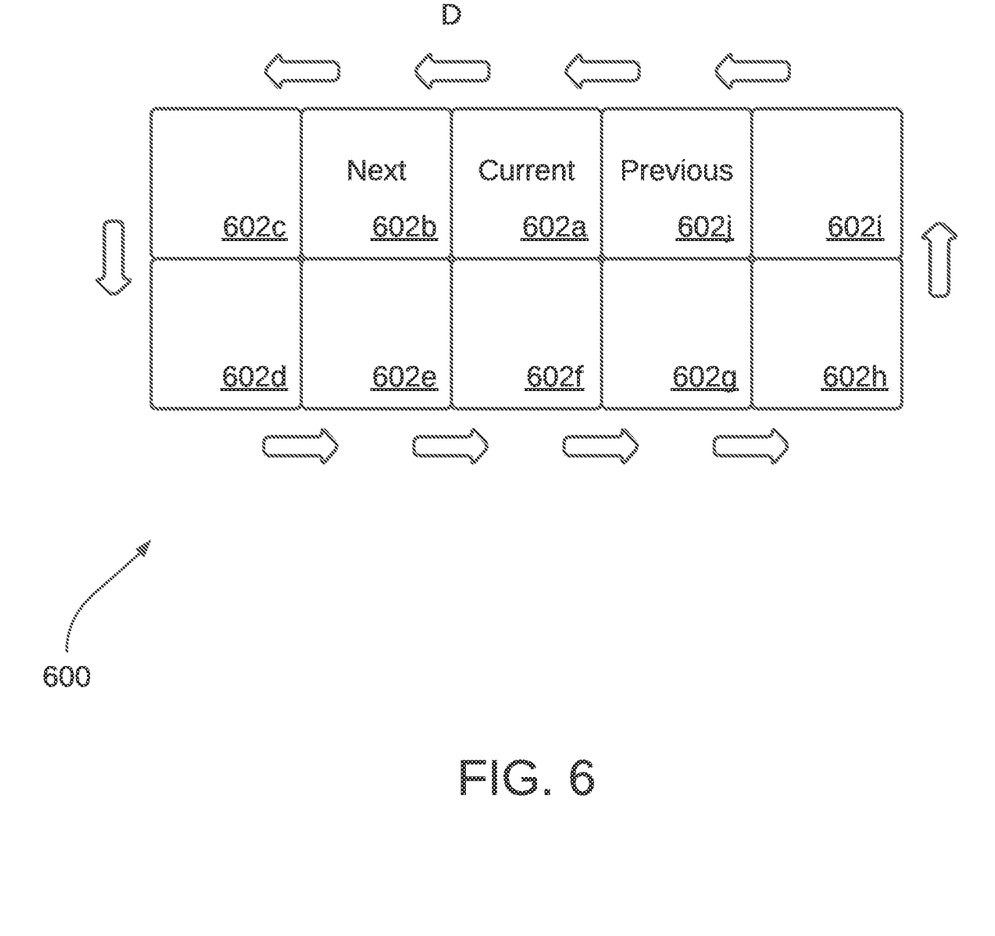
FIG. 6 illustrates an exemplary embodiment of a partial block diagram of rotation grazing for a ten-paddock area according to aspects of the present disclosure.

FIG. 6 illustrates an exemplary embodiment of a partial block diagram of rotation grazing system for a ten-paddock area according to aspects of the present disclosure. The system 600 includes ten paddocks 602a, 602b, 602c, 602d, 602e, 602f, 602g, 602h, 602i, and 602j. Although ten paddocks are illustrated, it should be appreciated that any number of paddocks may be used without departing from the spirit and scope of the present disclosure. Although described as paddocks, it should be appreciated that a paddock may be any designated space or area, and is not necessarily limited to enclosures, equal areas, or other limitation on size, shape, location, and/or usage as used herein.

A paddock 602a may be designated as a current usage area in the exemplary embodiment illustrated by FIG. 6. The current usage area paddock may include one or more assemblies 140 associated therewith which may be selectively designated in an operational mode relating to current usage. For example, the current usage area paddock may have one or more assemblies 140 which may be placed in a presence state and may selectively be placed or maintained in a mode relating to the presence of one or more animals or elements which might come into contact with an assembly 140, such as at a solar cell 230 thereof. The current usage area paddock may be configured to move between the paddocks 602 in a direction D, for example in a clockwise or counterclockwise manner, although any ordering or direction may be used. Transition between paddocks may be configured to be evenly distributed in timing or may be separately timed according to a predetermined or dynamically determined basis. When transitioning from a previous are, such as the paddock 602j in the embodiment illustrated by FIG. 6, a user such as a rancher may designate the next current area, such as 602a. Additionally or alternatively, the system may be configured to transition between current area paddocks 602 without requiring human intervention, such as based upon an automatic timing or herding configuration.

Once a next area is selected, a control signal may be transmitted to one or more assemblies 140 (e.g., as received at a communication module 260 thereof) to designate an operating mode, such as a presence mode, and one or more assemblies 140. This may include transitioning or maintaining one or more assemblies 140 in a presence (e.g., grazing) mode. The microprocessor 210 of an assembly 140 may be configured to control the panel actuator 240 to restrict an angle of one or more solar cells 230 to within a presence mode range, such as +/−20-degrees from parallel to ground, although other angle ranges may be used without departing from the spirit and scope of the present disclosure. A previous area which had been designated as the current use area may be configured to control one or more assemblies 140 to transition to or maintain a standard tracking mode. The microprocessor 210 of an assembly 140 may be configured to control the panel actuator 240 to restrict an angle of one or more solar cells 230 to within a standard tracking mode range, such as +/−55-degrees from parallel to ground, although other angle ranges may be used without departing from the spirit and scope of the present disclosure. Although placed in the standard tracking mode, one or more assemblies 140 may be configured to detect the presence of an object which might contact at least a portion of the assembly 140 during operation and may be configured to adjust one or more angle(s) of operation or other operational parameter so as to avoid the object, for example in real-time and/or in a predetermined manner.

In operation, a paddock 602 which is currently in grazing mode may be used to promote clearance for animals or other objects and may correspondingly change the energy generation profile. For a next destination paddock, an assembly 140 may be in a standard tracking mode. A user, such as a rancher or an electronic component may evaluate forage quality, water provisions, paddock fencing, and/or other element(s) and may selectively command one or more assemblies 140 to enter a grazing mode and may further verify that the paddock and assembly 140 are ready for animals. For a previous paddock having animals recently departed, grass within the paddock may begin regrowing. A user such as a rancher or an electronic component may return one or more assemblies of the previous paddock area to a standard tracking mode when all animals are confirmed to have left the paddock.

In operation during a cattle grazing example, a solar project may be segmented into multiple paddocks. Cattle may graze in one paddock intensely, while forage in other paddocks may recover and regrow. A paddock may be defined by one or more commonly controlled assemblies 140, a common electrical solar array, and may be fenced or virtually fenced. A rancher may prepare paddocks for animals, including defining a control state of one or more paddocks, and may escort animals when conditions for grazing are ready.

In addition to providing one or more operations previously described herein, implementations consistent with the present disclosure may provide numerous further advantages. For example, one or more sets of weather station instrumentation may be implemented or improved, including eddy covariance flux towers, soil moisture sensors, soil temperature sensors (e.g., share temperature and/or full sun temperature not under module measurement), and/or various configurations of remote sensing of a surrounding ecosystem function. The eddy covariance flux towers may be configured to directly or indirectly measure Greenhouse Gas (GHG) flux between atmosphere and soil on solar land, for example by measuring a flux value associated with one or more of $NO_2$, $CO_2$, $H_2O$, $NH_3$, or any other measurable GHG.

Implementations consistent with the present disclosure may include a method of controlling one or more assemblies of an energy generation system. The method may include selecting at least a portion of the one or more assemblies, transmitting at least one control signal associated with the selected at least a portion of the one or more assemblies, receiving the control signal at a communication module of the one or more assemblies, and modifying an operational parameter of the one or more assemblies responsive to the received control signal to avoid contact between the one or more assemblies and livestock. The operational parameter may be associated with a position of the at least a portion of the one or more assemblies relative to a ground surface. The operational parameter may additionally or alternatively be a range of angle of the at least a portion of the one or more assemblies. The operational parameter may additionally or alternatively be 20 degrees from parallel to the ground surface when operating in a grazing mode (e.g., +/−20 degrees). The operational parameter may be between 50-60 degrees from parallel to the ground surface when operating in a standard tracking mode (e.g., +/−50-60 degrees).

The operational parameter may provide a vertical clearance distance between a lowest portion of a section of the one or more assemblies and a ground surface. The one or more assemblies may be associated with a livestock paddock of a plurality of paddocks. The at least one control signal may be transmitted from a user device. The selecting the at least a portion of the one or more assemblies may be performed using the user device. The method may include transitioning livestock between a plurality of paddocks by designating a current use area, wherein the transitioning includes placing at least a portion of the one or more assemblies into a grazing mode and placing at least a portion of the one or more assemblies into a standard tracking mode from a grazing mode based upon status of the one or more assemblies as being within a current use area.

Implementations consistent with the present disclosure may further include a method of controlling one or more assemblies of an energy generation system including dividing a useable space into a plurality of regions, capturing solar energy using a plurality of assemblies located at one or more of the plurality of regions, designating a current use region of the plurality of regions, the current use region corresponding to a region associated with current or expected use by livestock, controlling an operational setting of at least one assembly of the plurality of assemblies, the at least one assembly associated with the current use region, and selectively adjusting an operational setting of at least one assembly of the plurality of assemblies associated status change in relation to a current use region.

The method may include wherein the designating the current use region comprises associating a livestock paddock with a current grazing status, and further comprising obtaining a selection of one or more of the plurality of assemblies associated with the livestock paddock and providing a control signal to the one or more of the plurality of assemblies to place the one or more of the plurality of assemblies associated with the livestock paddock into a grazing mode of operation. The placing the one or more of the plurality of assemblies associated with the livestock paddock into a grazing mode of operation may include limiting movement of at least a portion of the one or more of the plurality of assemblies to avoid contact between livestock within the livestock paddock and the one or more of the plurality of assemblies. The method may further include determining that a next livestock paddock is available for use, moving livestock within the current use region to the next livestock paddock, and designating the next livestock paddock as the current use region. The method may further include selecting at least a portion of the one or more of the plurality of assemblies associated with the livestock paddock, transmitting at least one control signal to the at least a portion of the one or more of the plurality of assemblies associated with the livestock paddock, and placing the at least a portion of the one or more of the plurality of assemblies associated with the livestock paddock into a standard tracking mode responsive to the at least one control signal.

Implementations consistent with the present disclosure may further include an assembly apparatus including at least one solar cell configured to capture solar energy, an energy storage configured to store at least a portion of solar energy captured by the at least one solar cell, a panel actuator configured to manipulate an operational parameter of the at least one solar cell, a communication module configured to receive at least one control signal, and a processor configured to control the panel actuator to manipulate the operational parameter of the at least one solar cell based at least in part upon the at least one control signal. The operational parameter may be a current or expected presence status adjacent to the at least one solar cell. The presence status may be a livestock presence indication, and the panel actuator may manipulate an orientation of the at least one solar cell responsive to a control signal received from the processor responsive to the operational parameter. The panel actuator may limit movement of the at least one solar cell within 20 degrees from parallel to a ground surface (e.g., +/−20 degrees) when the assembly apparatus operates in a grazing mode. The panel actuator may limit movement of the at least one solar cell within 55 degrees from parallel to a ground surface (e.g., +/−55 degrees and/or +/− between 50-60 degrees) when the assembly apparatus operates in a standard tracking mode.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. An energy generation system, comprising:
   livestock paddocks disposed in a plurality of regions;
   one or more energy generation assemblies located in each of the plurality of regions, each of the energy generation assemblies comprising:
   at least one solar cell configured to capture solar energy,
   a panel actuator configured to manipulate the position of the at least one solar cell within a range of angles from parallel to a ground surface,
   a communication module configured to receive the control signal from the computing device, and
   a processor configured to control the panel actuator to manipulate position of the at least one solar cell; and
   a computing device for selectively controlling the one or more energy generation assemblies the computing device configured to:
   designate one or more current use regions from among the plurality of regions wherein the one or more current use regions correspond to regions associated with current or expected use by livestock, and
   generate respective control signals to each of the one or more energy generation assemblies to place each energy generation assembly in either:
   a standard tracking mode if the generation assembly is disposed outside of the one or more current use regions, wherein the panel actuator of the generation assembly is configured to position the at least one solar cell at any angle within the range of angles from parallel to the ground surface or
   a grazing mode if the generation assembly is disposed within the one or more current use regions, wherein the panel actuator of the generation assembly is configured to restrict the position of the at least one solar cell to +/−20 degrees from parallel to the ground.

2. The energy generation system of claim 1, wherein for each of the energy generation assemblies, the respective processor is configured to designate whether the assembly is disposed within the one or more current use regions based at least in part on the control signal, and to operate the assembly in the grazing mode or the standard tracking mode based upon the designation.

3. The energy generation system of claim 2, wherein the computing device is further configured to:
  determine the movement or expected movement of livestock from a first of the plurality of regions that is the one or more current use regions to a second of the plurality of regions;
  designate the second of the plurality of regions as the one or more current use regions based on the determining of the movement or expected movement of the livestock from the first of the plurality of regions to the second of the plurality of regions; and
  generate respective control signals to the one or more energy generation assemblies disposed in the second of the plurality of regions to place the one or more energy generation assemblies disposed in the second of the plurality of regions into the grazing mode.

4. The energy generation system of claim 3, wherein the computing device is further configured to:
  cease to designate the first of the plurality of regions as the one or more current use regions based on the based on the determining of the movement or expected movement of the livestock from the first of the plurality of regions to the second of the plurality of regions; and
  generate respective control signals to the one or more energy generation assemblies located in the first of the plurality of regions to place the one or more energy generation assemblies disposed in the first of the plurality of regions into the standard tracking mode.

5. The energy generation system of claim 2, wherein when the respective processor designates that the assembly is disposed within the one or more current use regions, the respective processor operates the assembly in the grazing mode.

6. The energy generation system of claim 2, wherein when the respective processor designates that the assembly is disposed outside of the one or more current use regions, the respective processor operates the assembly in the standard tracking mode.

7. The energy generation system of claim 1, wherein the at least one solar cell is +/−50 degrees from parallel to the ground surface in the standard tracking mode.

8. The energy generation system of claim 1, wherein the at least one solar cell is between +/−60 degrees from parallel to the ground surface in the standard tracking mode.

9. The energy generation system of claim 1, wherein the range of angles is configured to provide a vertical clearance distance between a lowest portion of a section of the at least one solar cell and a ground surface.

10. The energy generation system of claim 1, wherein the computing device is configured to transition between the one or more current use regions without manual input.

11. The energy generation system of claim 1, wherein the computing device is configured to transition between the one or more current use regions based on received signals corresponding to a sensed presence or movement of livestock there between.

* * * * *